United States Patent [19]

Kho et al.

[11] 4,215,012

[45] Jul. 29, 1980

[54] CATALYST FOR INCREASING THE TENSILE STRENGTH AND CORE HARDNESS OF A SAND MOLD OR CORE

[75] Inventors: Khe-Bing J. Kho; Patrick H. Stewart, both of Danville, Ill.

[73] Assignee: C L Industries, Inc., Danville, Ill.

[21] Appl. No.: 891,137

[22] Filed: Mar. 28, 1978

Related U.S. Application Data

[62] Division of Ser. No. 809,546, Jun. 23, 1977.

[51] Int. Cl.$^2$ .......................... C08G 2/06; C08K 5/11
[52] U.S. Cl. .............................. 252/429 R; 252/426; 252/428; 260/31.8 M; 260/31.8 T
[58] Field of Search .................. 260/31.8 M, 31.8 T, 260/DIG. 40, 38; 252/429 R, 426, 436, 441, 433, 428

[56] References Cited

U.S. PATENT DOCUMENTS

| | | | |
|---|---|---|---|
| 1,720,051 | 7/1929 | Norton | 260/31.8 T |
| 2,321,766 | 6/1943 | Murdock | 260/31.8 T |
| 2,912,406 | 11/1959 | Less et al. | 260/31.8 T |
| 3,008,205 | 11/1961 | Blaies, Jr. | 260/38 |
| 3,306,864 | 2/1967 | Lang et al. | 260/38 |
| 3,637,577 | 1/1972 | Guyer et al. | 260/DIG. 40 |
| 4,070,327 | 1/1978 | Junger et al. | 260/31.8 T |

*Primary Examiner*—P. E. Konopka
*Attorney, Agent, or Firm*—Neal J. Mosely

[57] ABSTRACT

The tensile strength and core hardness of a sand mold or core is increased by incorporating into a mixture of a thermosetting acid-hardenable resin and sand, a dialkyl ester of the formula:

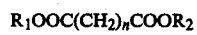

$$R_1OOC(CH_2)_nCOOR_2$$

wherein $R_1$ and $R_2$, which may be the same or different, are selected from alkyl of 1 to 20 carbon atoms and n is 2, 3 or 4. The ester may be added directly to the resin or sand, or in conjunction with the acid catalyst. Ferric chloride together with the dialkyl ester provides a sulfur-free catalyst for polymerization of the resin.

6 Claims, No Drawings

CATALYST FOR INCREASING THE TENSILE STRENGTH AND CORE HARDNESS OF A SAND MOLD OR CORE

This is a division of application Ser. No. 809,546 filed June 23, 1977.

BACKGROUND OF THE INVENTION

Sand molds and cores are conventionally employed in the foundry industry for the production of precision castings. These mold or cores are generally composed of sand particles bonded together with a resin binder.

A wide variety of techniques have been developed for the manufacture of sand molds. Generally, these techniques involve the use of thermosetting acid hardenable resin binders for the sand particles in order to form molds or cores having the requisite surface hardness smoothness, strength and gas permeability so as to produce precision castings.

One method which has found widespread use in producing sand molds and cores involves heating a patterned mixture of sand and a thermosetting resin at a temperature generally ranging from 300° F. to 600° F. for a period of time sufficient to melt or polymerize the resin and therefore produce the desired mold or core (i.e. the hot-box or shell methods). Such processes are described by Brown et al, U.S. Pat. No. 3,020,609 and Dunn et al, U.S. Pat. No. 3,059,297 (each of which is incorporated herein by reference in its entirety).

A particular disadvantage of the so called "shell" method resides in the high cost of the resin coated sand needed. Furthermore, both the shell and hot-box methods require heating of the pattern boxes to temperatures of from 300° F. to 600° F. for periods of time which results in a considerable consumption of energy and fuel which with todays ever growing energy crisis renders such techniques economically unattractive.

More recently, methods have been devised which eliminate the necessity of polymerizing the sand/resin mixture at elevated temperatures. These new methods, commonly referred to as 37 no-bake" or "cold-box" techniques, generally involve the use of an acid catalyst to polymerize the sand/thermosetting resin mixture. The acid catalyst may be in liquid, solid or gaseous form. Such processes are described by Blaies, U.S. Pat. No. 3,008,205; Dunn et al, U.S. Pat. No. 3,059,297; Peters et al, U.S. Pat. No. 3,108,340; Kottke et al, U.S. Pat. No. 3,145,438; Brown et al, U.S. Pat. No. 3,184,814; Robins, U.S. Pat. No. 3,639,654; Australian Pat. No. 453,160 and British Pat. No. 1,225,984, the entire contents of each of the foregoing being incorporated herein by reference in its entirety. Many of these processes involve the use of sulfur containing acid catalysts such as benzene sulfonic acid, toluene sulfonic acid and the like.

When using the "no-bake" or "cold-box" methods, foundrymen generally find the resulting mold or core to exhibit a low tensile strength, thereby necessitating the use of undesirably high amounts of resin to attain satisfactory strength and core hardness. Use of higher such amounts of resin is not only costly but provides a less satisfactory casting.

While such "no-bake" or "cold-box" methods provide a more efficient means of producing sand molds and cores, there is ever present the desirability of increasing the tensile strength and core hardness of such products. Likewise, in view of the relatively short cure time of some sand/resin/acid catalyst systems, it is desirable to increase the working time (i.e. mixing, mulling and depositing in mold or core forming cavity) of the sand/resin/catalyst mix.

In addition, some difficulty has been experienced by foundrymen in maintaining good steel strength qualities with precision steel castings made from sand molds or cores produced using a sulfur containing catalyst. With a no-bake process using a sulfur free catalyst steel strength is no problem.

Accordingly, it is the primary object of the present invention to overcome some of the aforementioned difficulties and provide a means for increasing the tensile strength and core hardness of sand molds and cores.

It is also an object of the present invention to provide a means for increasing the working time of sand/resin/catalyst mixes used in the formation of sand molds and cores.

A further object of the present invention is to provide new sulfur-free catalyst and resin materials for the production of sand molds or cores useful in providing precision steel castings free of sulfur defects.

Still a further object of our invention is to provide sand molds and cores having enhanced strength and core hardness.

These and other objects of our invention will be more apparent from the discussion which follows.

SUMMARY OF THE INVENTION

We have found that the working time, tensile strength and core hardness of sand molds or cores formed from sand particles bound with a thermosetting acid-hardenable resin may be increased by adding to a mixture of said sand and resin, prior to the curing of the resin, a dialkyl ester of the formula:

wherein $R_1$ and $R_2$, which may be the same or different, are selected from alkyl of 1 to 20, preferably 1–12 and most preferably 1 to 4, carbon atoms and n is 2, 3 or 4. The ester may be either blended with the resin or sand, or added in conjunction with an acid catalyst.

A particularly attractive and improved sulfur-free acid catalyst system according to the present invention for the polymerization of a thermosetting acid-hardenable resin consists essentially of ferric chloride and a dialkyl ester of the formula:

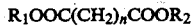

wherein $R_1$ and $R_2$, which may be the same or different, are selected from alkyl of 1 to 20, preferably 1–12 and most preferably 1 to 4, carbon atoms and n is 2, 3 or 4.

DESCRIPTION OF THE PREFERRED EMBODIMENTS

According to the present invention the tensile strength and core hardness of a sand mold or core formed by polymerizing a mixture of a thermosetting acid-hardenable resin and sand is increased by adding to said sand/resin mixture, in an amount sufficient to increase the tensile strength or core hardness of the polymerized mixture, a dialkyl ester of the formula:

wherein $R_1$ and $R_2$, which may be the same or different, are selected from alkyl of 1 to 20, preferably 1 to 12 and most preferably 1 to 4 carbon atoms and n is 2, 3 or 4.

Suitable esters include dimethyl succinate, methyl-ethyl succinate, methyl-n-propyl succinate, methyl isopropyl succinate, methyl-n-butyl succinate, diethyl succinate, ethyl-n-propyl succinate, diisopropyl succinate, dibutyl succinate, dimethyl glutarate, methyl-ethyl glutarate, methyl-n-propyl glutarate, methyl-isopropyl glutarate, methyl-n-butyl glutarate, methyl-isobutyl glutarate, diethyl glutarate, ethyl-n-propyl glutarate, diisopropyl glutarate, dibutyl glutarate, dimethyl adipate, methyl-ethyl adipate, methyl-n-propyl adipate, methyl-isopropyl adipate, diethyl adipate, dipropyl adipate and dibutyl adipate. Also, one may use dioctyl succinate, dioctyl adipate, octyl-nonyl glutarate, diheptyl glutarate, didecyl dicapryl adipate, dicapryl, succinate, dicapryl glutarate, dilauryl adipate, dilauryl succinate and dilauryl glutarate. Preferred esters for use according to the present invention are dimethyl succinate, dimethyl glutarate and dimethyl adipate with dimethyl glutarate being especially preferred.

The resins employed in forming sand molds or cores are thermosetting acid-hardenable resins well known and conventionally employed in the art. As used herein, the term "thermosetting acid-hardenable resins" refers to any organic material which may be mixed with sand and will cure under acid conditions. Such resins are well known as described for example in the aforementioned U.S. Pat. Nos. 3,008,205; 3,108,340, 3,184,814; British Pat. No. 1,225,984 and Bozer et al, U.S. Pat. No. 3,816,375, the entire contents of which is incorporated herein by reference. By way of further illustration, suitable resins include furfuryl alcohol and its low viscosity (i.e. below 500 centipoise) polymers, furfurylated urea resins, furfuryl alcohol/formaldehyde resins, urea/formaldehyde resins, phenol/formaldehyde resins, furfuryl alcohol/phenol/formaldehyde resins, and melamine formaldehyde resins. Preferred resins include those of furfuryl alcohol/formaldehyde, urea/formaldehyde, melamine/formaldehyde, phenol formaldehyde and mixtures thereof. The amount of resin added to the sand must be sufficient to bind the sand upon polymerization. Generally, the thermosetting acid-hardenable resin is added in an amount of from about 0.5 to 10%, and preferably about 1 to 2% and most suitably about 1.25% by weight, based on the weight of sand.

The acid catalysts suitable for initiating polymerization of the thermosetting acid-hardenable resins are generally well known and are described for example in the aforementioned U.S. Pat. Nos. 3,008,205; 3,020,609; 3,108,340; 3,145,438; 3,184,814; 3,639,654; 3,816,375 and Australian Pat. No. 453,160. The catalyst may be added to the resin or sand/resin mixture in liquid or gaseous form or may be formed insitu. By way of further illustration, but not limited thereto, such materials as benzene sulfonic acid, toluene sulfonic acid, cumene sulfonic acid, xylene sulfonic acid, sulfuric acid, hydrosulfuric acid, phosphoric acid and such Lewis acids as ferric chloride may be employed as catalysts. Benzene sulfonic acid and toluene sulfonic acid are preferred. However, it should be noted that in some instances it may be desirable to use a sulfur-free catalyst particularly where precision steel castings require no sulfur contamination have a smooth surface are mandatory. In such instances a Lewis acid or Brönsted acid catalyst may be used, and a preferred catalyst is ferric chloride, which optionally may be used together with another sulfur-free acid such as hydrochloric acid or nitric acid.

The acid catalyst is added to the resin or resin/sand mixture in an amount sufficient to initiate polymerization of the thermosetting acid-hardenable resin. Generally, from about 15 to 60%, and preferably 20 to 30%, by weight of the acid catalyst based on the weight of the resin is sufficient to initiate polymerization.

The dialkyl esters noted above may be incorporated into the sand molds or cores in a number of ways. If desired, the ester may be blended with the resin prior to or subsequent to mixing of the resin and sand. The dialkyl ester may generally be employed in an amount of from about 0.5 to 30% and preferably 2.25 to 10% by weight of the thermosetting acid-hardenable resin.

According to another embodiment of the invention, the dialkyl ester may be incorporated into the catalyst and added therewith to the resin or sand/resin mixture. In such a case, the amount of dialkyl ester added to the catalyst may suitably range from about 3 to 50% by weight of the catalyst.

The incorporation of such aliphatic dialkyl esters into sand/resin mixture has been found to increase the tensile strength of the resulting sand mold or cold by as much as 70%.

The following examples are offered in an effort to more fully describe the present invention, but are not to be construed as limiting the scope thereof. In the following examples, all percentages are by weight unless otherwise noted.

EXAMPLE I

A thermosetting acid-hardenable resin is prepared by mixing and heating precooked ureaformaldehyde and furfuryl alcohol together with a mixture of phenol formaldehyde, furfuryl alcohol and urea. The resin is neutralized with formic acid and 0.1% of a functional silane is added (gamma-amino propyltriethoxysilane available from Union Carbide under the designation A-1100).

To a number of batches containing 1500 parts standard Ottawa silica sand having an AFS fineness in the range 30-120, was added 1.25% of the prepared resin. The sand temperature was about 74° F.

These molding batches were used to prepare cured compositions using the following catalyst compositions:
Catalyst A—77.3% Benzene Sulfonic Acid (90% ) 12.1% Water 9.6% Methanol 1% $HBF_4$
Catalyst B—50.85% Toluene Sulfonic Acid 19.33% Benzene Sulfonic Acid 13.47% Water 15.00% Methanol 1.38% $HBF_4$
Catalyst C—100% Phosphoric Acid (75%)
Catalyst D—70.00% Toluene Sulfonic Acid 30.00% Methanol Catalyst prepared in accordance with the formulation above was first mixed with the sand. The quantity of catalyst used will vary from about 20% up to about 80% of the weight of resin to be used. The quantity of catalyst used is dependent on factors such as the acid demand of the sand, the temperature of the sand and upon the rate of speed of cure desired. Under the sand conditions given above, the quantity of catalyst used was 30% by weight of the resin. After thoroughly mulling the catalyst into the sand, the resin is added thereto and likewise, mulled. After mixing, the sand-resin catalyst mix is placed into a form, tamped or otherwise compacted and allowed to cure.

The set time and tensile strength at 2 and 24 hours was determined in each case and the results are set forth in Table I below.

EXAMPLE II

A number of acid catalysts were prepared in like manner to those of Example I above, with the addition of a dialkyl ester in accordance with the present invention. In each instance, the ester was mixed at room temperature with sulfuric acid and allowed to cool. Toluene sulfonic acid and/or benzene sulfonic acid together with water and methanol was then added. After mixing, the $HBF_4$ was added. The catalysts prepared had the following compositions:

Catalyst E—29% Toluene Sulfonic Acid 20% Water 7% Methanol 33% Mixture of 52.4% Dimethyl glutarate, 32% dimethyl succinate and 15.6% dimethyl adipate 10% Sulfuric Acid 1% $HBF_4$ Catalyst F—34.4% Toluene Sulfonic Acid 19.6% Water 14% Methanol 22.7% Mixture of 52.4% Dimethyl glutarate, 32% dimethyl succinate and 15.6% dimethyl adipate 6.9% Sulfuric Acid 2.6% $HBF_4$ Catalyst G—33% Toluene Sulfonic Acid 33% Dimethyl Glutarate and Dimethyl Adipate (15%/85% ratio) 15% Water 5% Methanol 12.5% Sulfuric Acid 1.5% $HBF_4$ Catalyst H—33% Toluene Sulfonic Acid 33% Dimethyl Glutarate 15% Water 5% Methanol 12.5% Sulfuric Acid 1.5% $HBF_4$ Catalyst compositions E, F, G and H were blended with the same sand resin mixture and in the same manner and amounts as the catalyst compositions of Example I, and the set time and tensile strength measured. The results are set forth in Table I.

TABLE I

| Catalyst | Set Time (Minutes) | Average 2 Hour Tensile Strength (lbs) | Average 24 Hour Tensile Strength (lbs) |
|---|---|---|---|
| I A | 23 | 310 | 357 |
| I B | 28 | 376 | 455 |
| I C | 79 | 213 | 504 |
| I D | 24 | 319 | 370 |
| II E | 38 | 457 | 507 |
| II F | 49 | 424 | 446 |
| II G | 27 | 430 | 531 |
| II H | 27 | 480 | 540 |

EXAMPLE III

Two sulfur-free catalyst compositions were prepared having the following compositions:

Catalyst J—90.5% $FeCl_3$ 8.0% HCl 1.5% $HBF_4$
Catalyst K—90.5% Mixture of 92% $FeCl_3$ and 8% Dimethyl Glutarate 8.0% HCl 1.5% $HBF_4$ The $FeCl_3$ employed was a sewage grade solution containing 37 to 47% $FeCl_3$ having up to 0.5 maximum HCl and obtained from Dextrex Chemical Company).

Catalyst J was prepared by mixing the ingredients in the proportions noted. Since dimethyl glutarate is not readily soluble in $FeCl_3$, catalyst K was prepared by mixing 92 parts $FeCl_3$ with 8 parts dimethyl glutarate and the mixture heated until 90.5 parts of a miscible solution resulted the solution was cooled and the HCl and $HBF_4$ added.

In the same manner as Example I, 25% of catalyst J and K were added to the resin and the resin was mulled with sand in an amount of 1.25%. The set time and tensile strength at 2 and 24 hours as well as the scratch hardness at 2 and 24 hours was determined in each case and the results set forth in Table II below.

TABLE II

|  | Catalyst J | Catalyst K |
|---|---|---|
| Set Time (minutes) | 37 | 31 |
| Average 2 Hour Tensile Strength (lbs) | 180 | 266 |
| Average 24 Hour Tensile Strength (lbs) | 155 | 312 |
| Average Scratch Hardness-2 Hours | 62 | 77 |
| Average Scratch Hardness-24 Hours | 73 | 81 |

Other thermosetting acid-hardenable resins when used in combination with the other aliphatic dialkyl esters according to the present invention show the same benefits as exemplified above.

The invention in its broader aspects is not limited to the specific details shown and described, but departures may be made from such details within the scope of the accompanying claims without departing from the principles of the invention.

The invention may furthermore comprise, consist or consist essentially of the hereinbefore recited materials and steps.

We claim:

1. A sulfur-free catalyst composition for the polymerization of a thermosetting acid hardenable resin, said catalyst consisting essentially of a Lewis or Brönsted acid and 3–50% wt., based on said acid, of a dialkyl ester of the formula:

$$R_1OOC(CH_2)_nCOOR_2$$

wherein $R_1$ and $R_2$, which may be the same or different, are selected from alkyl of 1 to 20 carbon atoms and n is 2, 3 or 4, undiluted or in solution.

2. The catalyst of claim 1 wherein $R_1$ and $R_2$ are selected from alkyl of 1 to 6 carbons.

3. The catalyst of claim 1 wherein said Lewis acid is ferric chloride.

4. The catalyst of claim 3 further containing hydrochloric acid.

5. The catalyst of claim 1 wherein said ester is selected from the group consisting of dimethyl succinate, dimethyl glutarate, and dimethyl adipate.

6. The catalyst of claim 1 in which said acid comprises a mixture of $FeCl_3$, HCl and $HBF_4$ and said ester is dimethyl glutarate, dimethyl succinate or dimethyl adipate or mixtures thereof.